(12) United States Patent
Martinoni

(10) Patent No.: US 9,233,505 B2
(45) Date of Patent: Jan. 12, 2016

(54) POWDER COMPOSITIONS AND METHODS OF MANUFACTURING ARTICLES THEREFROM

(75) Inventor: Raffaele Martinoni, Wolfhausen (CH)

(73) Assignee: 3D Systems, Inc., Rock Hill, SC (US)

( * ) Notice: Subject to any disclaimer, the term of this patent is extended or adjusted under 35 U.S.C. 154(b) by 914 days.

(21) Appl. No.: 12/513,266

(22) PCT Filed: Oct. 30, 2007

(86) PCT No.: PCT/US2007/082953
§ 371 (c)(1),
(2), (4) Date: May 1, 2009

(87) PCT Pub. No.: WO2008/057844
PCT Pub. Date: May 15, 2008

(65) Prior Publication Data
US 2010/0068330 A1  Mar. 18, 2010

Related U.S. Application Data

(60) Provisional application No. 60/865,112, filed on Nov. 9, 2006.

(51) Int. Cl.
*C08K 3/00* (2006.01)
*B29C 67/00* (2006.01)
*C08K 7/10* (2006.01)
*C08L 77/00* (2006.01)

(52) U.S. Cl.
CPC .............. *B29C 67/0077* (2013.01); *C08K 7/10* (2013.01); *C08L 77/00* (2013.01); *C08L 2205/16* (2013.01); *Y10T 428/256* (2015.01)

(58) Field of Classification Search
CPC ............................ C08L 77/00; C08L 2205/16
USPC .................. 524/599, 442, 555, 401, 443, 538
See application file for complete search history.

(56) References Cited

U.S. PATENT DOCUMENTS

| | | |
|---|---|---|
| 3,763,109 A | 10/1973 | Witsiepe |
| 3,946,089 A | 3/1976 | Furukawa et al. |
| 4,214,019 A | 7/1980 | Donermeyer et al. |
| 4,217,376 A | 8/1980 | Donermeyer et al. |
| 4,247,508 A | 1/1981 | Housholder |
| 4,252,712 A | 2/1981 | Donermeyer et al. |
| 4,458,039 A * | 7/1984 | Eickman ...................... 523/216 |
| 4,480,008 A | 10/1984 | Farronato et al. |
| 4,525,495 A | 6/1985 | Dorman et al. |
| 4,708,839 A * | 11/1987 | Bellet et al. ...................... 264/85 |
| 4,764,424 A | 8/1988 | Ganga et al. |
| 4,863,538 A | 9/1989 | Deckard |
| 4,944,817 A | 7/1990 | Bourell et al. |
| 5,017,753 A | 5/1991 | Deckard |
| 5,156,697 A | 10/1992 | Bourell et al. |
| 5,194,577 A * | 3/1993 | Chen ............................ 528/338 |
| 5,247,052 A | 9/1993 | Lucke et al. |
| 5,260,009 A | 11/1993 | Penn |
| 5,304,329 A | 4/1994 | Dickens, Jr. et al. |
| 5,342,919 A | 8/1994 | Dickens, Jr. et al. |
| 5,357,040 A | 10/1994 | McGrath et al. |
| 5,382,308 A | 1/1995 | Bourell et al. |
| 5,385,780 A | 1/1995 | Lee |
| 5,541,277 A | 7/1996 | Mühlfeld et al. |
| 5,733,497 A * | 3/1998 | McAlea et al. ................ 264/497 |
| 5,747,560 A * | 5/1998 | Christiani et al. ............ 523/209 |
| 5,910,558 A | 6/1999 | Schoenherr et al. |
| 6,110,411 A | 8/2000 | Clausen et al. |
| 6,184,282 B1 | 2/2001 | Gareiss et al. |
| 6,245,281 B1 | 6/2001 | Scholten et al. |
| 6,362,269 B1 * | 3/2002 | Ishihata et al. ................ 524/449 |
| 6,531,086 B1 | 3/2003 | Larsson |
| 6,713,125 B1 | 3/2004 | Sherwood et al. |
| 6,740,698 B2 * | 5/2004 | Akkapeddi et al. ........... 524/394 |
| 6,814,926 B2 | 11/2004 | Geving et al. |
| 6,932,610 B2 | 8/2005 | Ono et al. |
| 6,953,815 B2 * | 10/2005 | Enomoto et al. .............. 523/348 |
| 6,984,377 B2 | 1/2006 | Witham et al. |
| RE39,354 E | 10/2006 | Dickens, Jr. et al. |
| 7,148,286 B2 | 12/2006 | Baumann et al. |
| 7,211,615 B2 | 5/2007 | Baumann et al. |
| 7,261,542 B2 | 8/2007 | Hickerson et al. |
| 7,312,269 B2 | 12/2007 | Cevolini |
| 8,114,334 B2 | 2/2012 | Martinoni et al. |
| 8,263,697 B2 * | 9/2012 | Miyoshi et al. ................ 524/494 |

(Continued)

FOREIGN PATENT DOCUMENTS

| | | |
|---|---|---|
| DE | 4301543 A1 | 7/1994 |
| DE | 19942071 | 9/1999 |
| DE | 19927923 A1 | 7/2000 |
| DE | 10055465 A1 | 5/2002 |
| DE | 10129305 A1 | 12/2002 |
| EP | 0026806 A1 | 4/1981 |
| EP | 0196972 B1 | 10/1986 |
| EP | 0392285 A2 | 10/1990 |
| EP | 0399272 A2 | 11/1990 |
| EP | 0413258 A1 | 2/1991 |

(Continued)

OTHER PUBLICATIONS

Wypych, George. Handbook of Fillers, 2nd Edition. Toronto, ChemTec Publishing, 2000, p. 167.*

(Continued)

*Primary Examiner* — Wenwen Cai

(57) ABSTRACT

Powder compositions and articles and methods of forming articles from powder compositions are provided. The powder compositions include at least one polymer powder and an amount of reinforcing particles having an aspect ratio of preferably at least about 5:1. In a preferred embodiment, the powder composition is capable of being formed, via a laser sintering process, into a three-dimensional article that exhibits one or more desirable mechanical properties in an elevated temperature environment.

27 Claims, 4 Drawing Sheets

(56) References Cited

U.S. PATENT DOCUMENTS

| | | | |
|---|---|---|---|
| 2001/0036516 A1 | 11/2001 | Schmidt | |
| 2001/0050031 A1 | 12/2001 | Bredt et al. | |
| 2002/0053257 A1 | 5/2002 | Brice et al. | |
| 2002/0149137 A1 | 10/2002 | Jang et al. | |
| 2003/0186042 A1 | 10/2003 | Dunlap et al. | |
| 2004/0018202 A1 | 1/2004 | Adair | |
| 2004/0175686 A1* | 9/2004 | Ono et al. | 434/274 |
| 2004/0192859 A1* | 9/2004 | Parker et al. | 525/438 |
| 2004/0204531 A1* | 10/2004 | Baumann et al. | 524/492 |
| 2004/0226405 A1 | 11/2004 | Geving et al. | |
| 2004/0232583 A1* | 11/2004 | Monsheimer et al. | 264/113 |
| 2005/0003189 A1* | 1/2005 | Bredt et al. | 428/402 |
| 2005/0027098 A1 | 2/2005 | Hayes | |
| 2005/0197446 A1 | 9/2005 | Loyen et al. | |
| 2005/0207931 A1 | 9/2005 | Hesse et al. | |
| 2006/0036012 A1 | 2/2006 | Hayes et al. | |
| 2006/0041041 A1 | 2/2006 | Douais et al. | |
| 2006/0052508 A1 | 3/2006 | Cevolini | |
| 2007/0045891 A1 | 3/2007 | Martinoni et al. | |
| 2007/0065635 A1 | 3/2007 | Sauer | |
| 2007/0123625 A1* | 5/2007 | Dorade et al. | 524/423 |
| 2007/0126159 A1 | 6/2007 | Simon et al. | |
| 2007/0132158 A1 | 6/2007 | Martinoni et al. | |
| 2007/0267766 A1 | 11/2007 | Hesse et al. | |

FOREIGN PATENT DOCUMENTS

| | | |
|---|---|---|
| EP | 0911142 A1 | 4/1999 |
| EP | 0879137 B1 | 1/2002 |
| EP | 1443073 A1 | 8/2004 |
| EP | 1571173 A1 | 9/2005 |
| EP | 1604808 A2 | 12/2005 |
| EP | 1634693 A1 | 3/2006 |
| FR | 1525016 | 5/1968 |
| FR | 2873380 A1 | 1/2006 |
| GB | 1147052 | 4/1969 |
| GB | 2373747 A | 10/2002 |
| JP | 09-291210 H | 11/1997 |
| JP | 2003221493 A | 8/2003 |
| WO | 9606881 A2 | 3/1996 |
| WO | 9617003 A1 | 6/1996 |
| WO | 2004113042 A2 | 12/2004 |
| WO | 2005025839 A1 | 3/2005 |

OTHER PUBLICATIONS

ChemYQ (http://www.chemyq.com/En/xz/xz3/23021imdhp.htm), 2015.*
Brochure commercial "DURAFORM PA ET GF, Materiaux pour systemes SLS," 2001 (2 pages).
Singh, et al., "Polyester Moulding Compounds of Natural Fibres and Wollastonite", Journal Article. Central Building Research Institute, Roorkee 247 667, India, revised Jun. 24, 2003, accepted Jul. 4, 2003 (9 pages).
International Search Report for PCT/US2007/082953 dated Jul. 2, 2008. (4 pages).
Written Opinion for PCT/US2007/082953 dated Jul. 2, 2008. (8 pages).
Cheng et al., "Thermal analysis of poly(butylene terephthalate) for heat capacity, rigid-amorphous content, and transition behavior," Macromolecular Chemistry and Physics, vol. 189, Issue 10: 2219-2512 (1988).
Quarzwerke Gruppe; Product description for Tremin 939® and Tremin® 283; Wollastonite: Reinforcement, low thermal expansion (not dated); Retrieved from the internet at www.quarzwerke.com/home on Jun. 1, 2010 (2 pages).
Cuillo, Peter A., et al; Wollastonite A Versatile Functional Filler; pcimag.com; Posted Nov. 1, 2002 (7 pages).
Duroplastic Articles, "Guide to Fillers," obtained from the Internet at http://www.duroplastic.com/pdf/articles/arts/GuideToFillers.pdf (2 pages).
3D Systems: "Materialbezeichnung : DuraForm FlexSeal Trankflussigkeit" Datenblatt Zur Materialsicherheit, [Online] Mar. 8, 2005, XP 002413455 Retrieved from the Internet: URL:http://www.3dsystems.com/products/datafiles/lasersintering/msds/ DuraForm__Flex/24130-S12-00-A,SDS,EU,FlexSeal,BLK-YLW-NTL__german.pdf> [retrieved on Jan. 8, 2007] Issued Aug. 3, 2005 (5 pages).
DuPont™ Hytrel® thermoplastic polyester elastomer product guide and properties (15 pages).
GIVUL LAN 2056 Product Data Sheet, pp. 1-2; Material Safety Data Sheet, pp. 1-4; Getahindus (M) SDN BHD.
GIVUL LP2 Product Data Sheet, Getahindus (M) SDN BHD, pp. 1-2.
GIVUL MR Product Data Sheet, pp. 1-2; Material Safety Data Sheet, pp. 1-4; Getahindus (M) SDN BHD.
LOPROTEX TPX Product Data Sheet, pp. 1-3; Material Safety Data Sheet, pp. 1-4; Getahindus (M) SDN BHD.
Ullmann's Encyclopedia of Industrial Chemistry, vol. 11, p. 360, paragraph bridging the two columns.
R.D. Cadle, "Particle Size Determination", Interscience Publishers, Inc., 1955, pp. 52 et seqq.
"Fiber", http://en/wikipedia.org/wiki/Fiber.
Appendix B to § 1910.1001, Detailed Procedures for Asbestos Sampling and Analysis, Non Mandatory. Occupational Safety & Health Administration; http://www.osha.gov/pls/oshaweb.show__documents?p_table=STANDARDS@p_id=9997.
Reply of the patent proprietor to the notice(s) of opposition filed against EP2087031, dated Apr. 12, 2013.
English-language translation of the opposition brief filed by Opponent 1 (Evonik Degussa) against EP2087031, dated Jun. 20, 2012.
English-language translation of the opposition brief filed by Opponent 2 (EOS GmbH) against EP2087031, dated Jun. 20, 2012.
3D Systems: "A thermoplastic elastomer with excellent durability, resistance to heat and chemicals, and long-term stability" Internet Article, [Online] Jun. 1, 2005, XP002413454 Retrieved from the Internet: URL:http://www.3dsystems.com/products/datafiles/lastersintering/datasheets/DS-DuraForm__Flex__plastic.pdf>.
3D Systems: "Materialbezeichnung: DuraForm FlexSeal Trankflussigkeit" Datenblatt Zur Materialsicherheit, [Online] Mar. 8, 2005, XP 002413455 Retrieved from the Internet: URL:http://www.3dsystems.com/products/datafiles/lasersintering/msds/DuraForm__Flex/24130-S12-00-A,SDS,EU,FlexSeal,BLK-YLW-NTL__german.pdf> [retrieved on Jan. 8, 2007] Issued Aug. 3, 2005 (5 pages).
Advantage 357 Defoamer for Water-Based Paint Systems Product Data Sheet; Hercules, Copyright 1999 by Hercules Incorporated; pp. 1-2.
Anonymous: "DTM Releases Infiltration for use with DSM Somos" The Auto Channel News Bulletin, [Online] Apr. 8, 1999, XP002413452 Retrieved from the Internet: URL:www.theautochannel.com/news/press/date/19990407/press021449.html> [retrieved on Jan. 5, 2007] (2 pages).
Getahindus (M) Sdn. Bhd. Product Range of natural rubber latex products. Retrieved on Jun. 6, 2005 from http://www.getahindus.com.my/product.htm, pp. 1-3.
Protocam: "Somos 201 and Somos 201 infiltrated properties" Internet Article—Datasheet, [Online] Feb. 4, 2005, XP002413453 Retrieved from the Internet: URL:http://www.protocam.com/pdf/Somos201.pdf> [retrieved on Jan. 4, 2007] (1 page).
English-language translation of the opposition brief filed by Opponent 2 (EOS GmbH) against EP2087031, dated Oct. 21, 2013. (13 pages).
European Patent Office opinion of opposition of EP2087031 dated Jan. 22, 2014. (8 pages).
Exerpt from Rompp "Chemie Lexikon", vol. 2, 9th Edition, Gerog Thieme publishing house, 1990. (2 pages).
Pfister, Neue Materialen fur das selektive Laserintern (New materials for selective laser sintering), dissertation Sep. 2005. (7 pages).
Written Submission of the patent proprietor regarding the opposition filed against EP2087031, dated Oct. 20, 2014 (41 pages).

\* cited by examiner

POWDER COMPOSITIONS AND METHODS OF MANUFACTURING ARTICLES THEREFROM

CROSS REFERENCE TO RELATED APPLICATION

This application is the National Stage filing under 35 U.S.C. 371 of International Application No. PCT/US2007/082953 filed on Oct. 30, 2007, which claims priority to Provisional Application Ser. No. 60/865,112 filed on Nov. 9, 2006, entitled "Powder Compositions and Methods of Manufacturing Articles Therefrom," both of which are incorporated herein by reference in their entirety.

TECHNICAL FIELD

This invention relates to powder compositions and methods of manufacturing articles from powder compositions.

BACKGROUND

Laser sintering ("LS"), also termed selective laser sintering, is a process whereby a dispenser deposits a layer of powdered material into a target area. A laser control mechanism, which typically includes a computer that houses the design of a desired article, modulates and moves a laser beam to selectively irradiate the powder layer within the defined boundaries of the design, resulting in melting of the powder on which the laser beam falls. The control mechanism operates the laser to selectively sinter sequential powder layers, eventually producing a completed article comprising a plurality of layers sintered together. A detailed description of LS technology can be found in U.S. Pat. Nos. 4,247,508, 4,863,538, 5,017,753, and 6,110,411, each incorporated herein by reference.

LS technology has enabled the direct manufacture of three-dimensional articles of high resolution and dimensional accuracy from a variety of powdered materials including polymer powders. These articles are well suited to rapid prototyping and various other applications. However, articles produced from conventional polymer powders via LS processes typically exhibit inferior mechanical properties relative to articles produced by more conventional manufacturing processes (e.g., injection molding). In addition, such articles are generally not suitable for use in elevated temperature environments due to degradation of mechanical properties.

Carbon fibers and glass fibers have been considered as filler materials to improve the mechanical properties of LS articles. Carbon fibers, however, are relatively expensive, may require careful handling to minimize or avoid particle inhalation issues (due to the particle size and bulk density typically associated with carbon fibers), can be difficult to process in LS equipment due to its black coloration and the additional infrared absorption associated therewith, and may not be suitable for producing white, light-colored and/or bright articles. As for glass fibers, they are relatively expensive and may be difficult to obtain in predictable commercial quantities of consistent and suitable quality.

Thus, there is a continuing need for improved powder compositions for use in producing LS articles that exhibit suitable mechanical properties at ambient and/or elevated temperatures.

SUMMARY

In one embodiment, the present invention provides a powder composition that includes at least one polymer powder that is preferably laser-sinterable and reinforcing particles preferably having an aspect ratio of at least about 5:1 and a maximum dimension of less than about 300 microns. The reinforcing particles preferably comprise at least about 3 weight percent ("wt-%") of the powder composition, based on the total weight to the powder composition. Preferably, the reinforcing particles include mineral particles that comprise at least about 1 wt-% of the powder composition, based on the total weight of the powder composition.

In another embodiment, the present invention provides a method for laser-sintering powder compositions described herein to form a three-dimensional article.

In yet another embodiment, the present invention provides a three-dimensional article that includes a plurality of sintered layers that include a polymer matrix and reinforcing particles dispersed throughout the polymer matrix. In a preferred embodiment, the reinforcing particles have an aspect ratio of at least about 5:1 and a maximum dimension of less than about 300 microns. Preferably, the reinforcing particles comprise at least about 3 wt-% of the plurality of sintered layers, based on the total weight of the plurality of sintered layers, and include mineral particles that comprise at least about 1 wt-% of the plurality of sintered layers, based on the total weight of the plurality of sintered layers.

In yet another embodiment, the present invention includes a method for forming a mold. The method includes providing a powder composition including a polymer powder and at least about 3 wt-% of reinforcing particles preferably having an aspect ratio of at least about 5:1 and a maximum dimension of less than about 300 microns. The powder composition is laser-sintered to form a mold that is preferably capable of forming a molded product from a material having a temperature of greater than about 130° C.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and drawings, and from the claims.

SELECTED DEFINITIONS

Unless otherwise specified, the following terms used in this specification have the meanings provided below.

The term "aspect ratio" describes the degree to which the overall three-dimensional shape of a particle generally deviates from a compact three-dimensional shape (e.g., a spherical or cube-like shape). The aspect ratio of a given particle or population of particles is expressed as a ratio of length:width. A particle having a large aspect ratio is generally long and narrow, while a particle having an aspect ratio near 1 is generally compact. By definition, a particle cannot have an aspect ratio less than 1.

FIG. 1 shows a generic representative particle P having parallel square faces 10 and 12, whereby face 10 has a larger surface area than face 12. As illustrated graphically in FIG. 1, the "length" component of the aspect ratio of particle P is a maximum dimension L of particle P as taken along a major axis $A_1$. The "width" component of the aspect ratio represents a maximum crosswise dimension W of particle P that lies within a plane (or cross-section) located perpendicular to the major axis $A_1$. As shown in FIG. 1, maximum crosswise dimension W is taken along minor axis $A_2$ of the plane defined by minor axes $A_2$ and $A_3$. Processes for measuring aspect ratios of particles are known in the art. A description of one such representative process is found in U.S. Pat. No. 6,984,377.

The term "laser-sinterable polymer powder" refers to a polymer powder that is capable of being sintered in a LS machine to form a three-dimensional article. A laser-sinterable polymer powder is preferably capable of (1) being applied to a build surface of a LS machine, (2) being melted by a laser beam of the LS machine to form a first layer (either in the presence or absence of one or more additional materials), and (3) forming a second overlying layer adhered to the first layer.

The term "heat deflection temperature" (hereinafter "HDT") generally refers to the temperature at which a LS test specimen deflects by a specified distance when subjected to a specified load at a specified rate of temperature increase. More specifically, the term "HDT" refers to the temperature of deflection under load ("$T_f$") for a LS test specimen as determined using Method A of International Standard Organization International Standard 75-2, Second edition, 2004-05-15 (hereinafter "ISO 75-2:2004").

The term "LS article" refers to a three-dimensional article produced from a composition using a laser-sintering process.

The term "maximum dimension" refers to the longest linear dimension (or diameter) of a particle taken along the major axis of the particle. See maximum dimension L of FIG. 1, for example.

The term "maximum crosswise dimension" refers to the longest linear dimension (or diameter) of a particle that resides within any plane of the particle located perpendicular to the maximum dimension. See maximum crosswise dimension W of FIG. 1, for example. Further, for example, assuming the maximum crosswise distance of a particle lies within: a) an elliptical cross-section, then the maximum crosswise dimension passes through the two foci of the elliptical cross-section; b) a rectangular cross-section, then the maximum crosswise direction corresponds to a hypotenuse of the rectangular cross-section; and c) a circular cross-section, than the maximum crosswise dimension is equal to the diameter of the circular cross-section.

The term "mineral" refers to any of the genus of naturally occurring inorganic substances (including fossilized organic substances) that typically have a definite chemical composition and a characteristic crystalline structure, color, or hardness. The term encompasses both purified minerals and synthetically-produced equivalents of naturally-occurring minerals.

The term "reinforcing particle" refers to types of particles that, when included in suitable amounts in a three-dimensional article, improve one or more mechanical properties of the article (e.g., tensile strength, elongation at break, modulus, heat deflection temperature, etc.).

The term "test specimen" and "LS test specimen", when used in the context of HDT, refer to bars produced by suitable LS processes and having the preferred dimensions specified in ISO 75-2:2004 (i.e., 80×10×4 millimeters (length×width×thickness)). The sintered layers of the test specimens are oriented in the flatwise planar direction (i.e., parallel to a plane defined by the width and length of the test specimen).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention provides a powder composition that includes (a) an amount of reinforcing particles preferably having an aspect ratio of at least about 5:1 and a maximum dimension of less than about 300 microns, and (b) at least one polymer powder that is preferably laser sinterable. The powder composition preferably includes an amount of the reinforcing particles suitable to enhance one or more mechanical properties of an article formed therefrom. Preferably, at least some of the reinforcing particles are mineral particles.

The powder composition of the present invention may be useful in the production of a variety of articles, including, for example, LS articles that preferably exhibit one or more enhanced mechanical properties at ambient and/or elevated temperatures.

Figure 1:
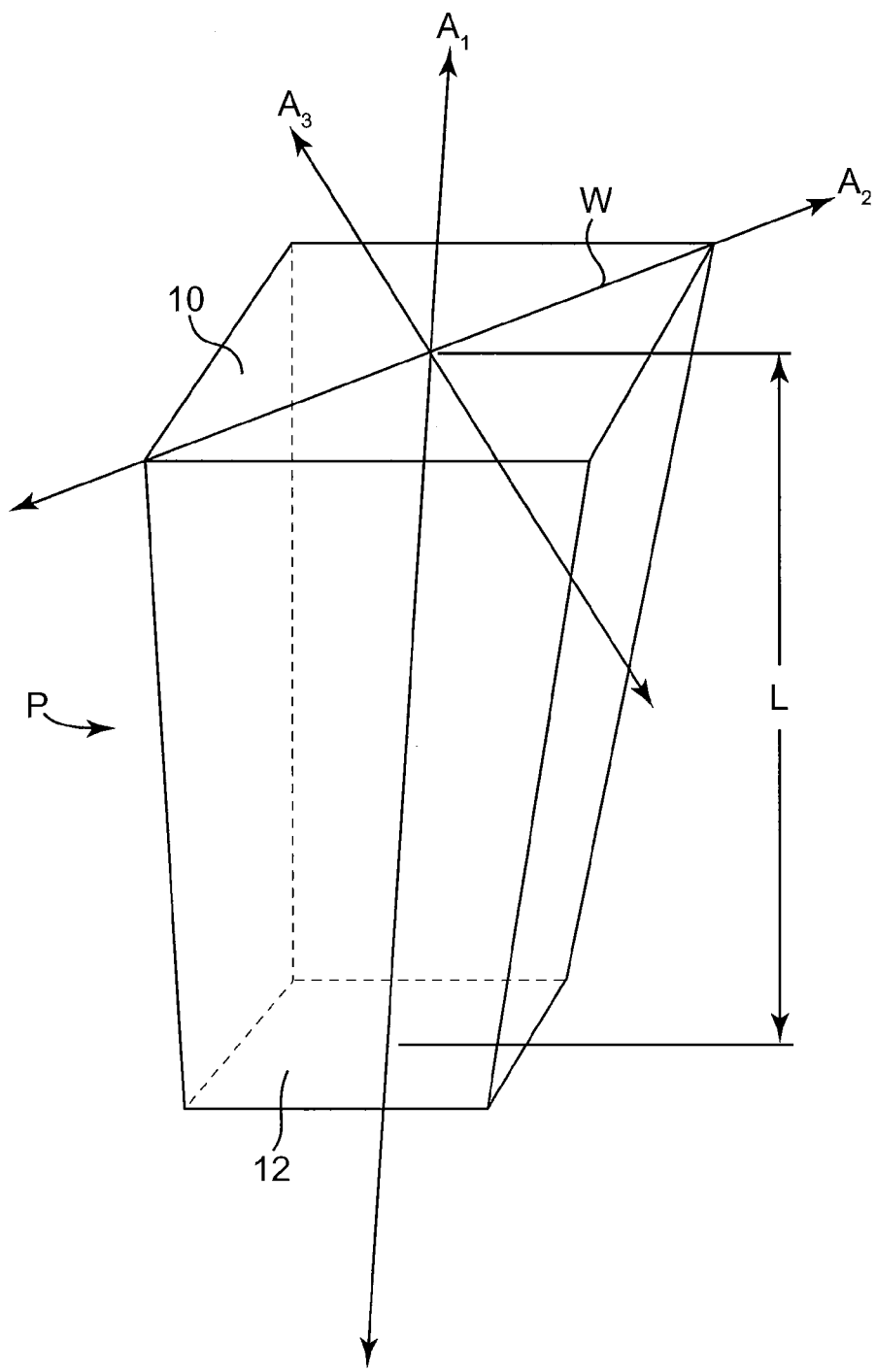
FIG. 1 is a perspective view of a generic particle provided to illustrate determination of the aspect ratio of the particle.
Figure 2A:
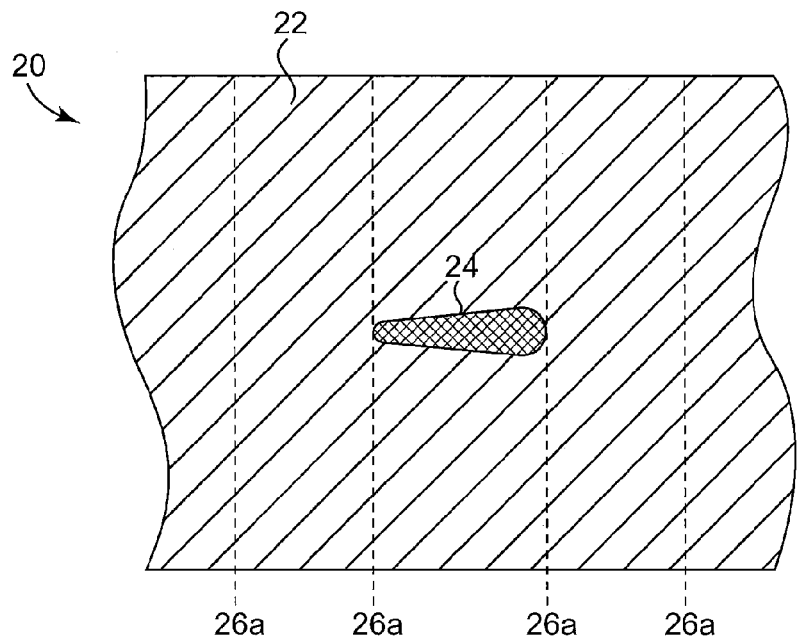
FIG. 2A is a schematic cross-sectional view of a portion of an article containing reinforcing particles.
Figure 2B:
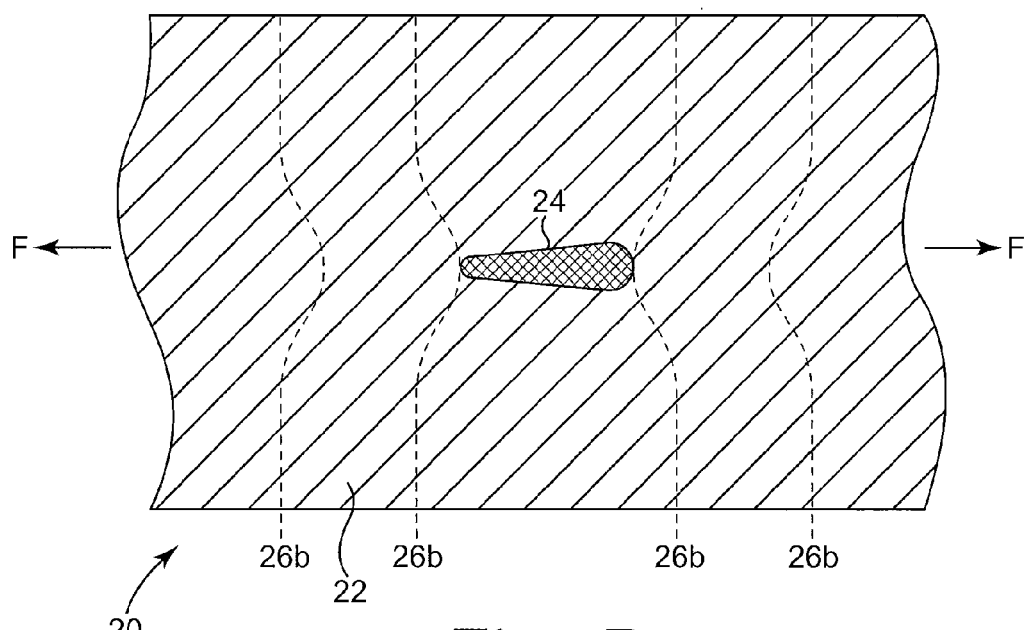
FIG. 2B is a schematic cross-sectional view of the article portion of FIG. 2A, when subjected to a tensile load.

FIGS. 2A and 2B illustrate how, in some embodiments, a physical property of the reinforcing particles may enhance one or more mechanical properties of an article containing the reinforcing particles. FIGS. 2A and 2B are schematic cross-sectional views of a portion of an article 20 ("article portion 20") and are not drawn to scale. Article portion 20 includes polymer matrix 22 and reinforcing particles 24 dispersed throughout polymer matrix 22. For purposes of illustration, a single reinforcing particle 24 is shown. Reference lines 26a, which are spaced equidistant from one another in FIG. 2A, are included for purposes of illustrating polymer matrix 22 when in a non-deformed state.

As shown in FIG. 2B, upon application of tensile load F to article portion 20, polymer matrix 22 deforms longitudinally. The deformation of polymer matrix 22 is illustrated by deformed reference lines 26b—portions of which are shifted longitudinally relative to reference lines 26a of FIG. 2A. While not intending to be bound by theory, reinforcing particle 24 is thought to cause an overall reduction in the amount of strain within polymer matrix 22 due to reinforcing particle 24 being preferably more stiff than polymeric matrix 22. This strain reduction is especially prevalent in portions of polymer matrix 22 located near reinforcing particle 24, as evidenced by the curvature of deformed reference lines 26b.

In preferred embodiments, LS test specimens formed from powder compositions of the present invention exhibit a HDT that is greater than that of LS test specimens formed in the same manner from identical powder compositions lacking a suitable amount of suitable reinforcing particles. In such embodiments, LS test specimens formed from powder compositions of the present invention preferably exhibit a HDT that is at least about 10° C. higher than that of LS test specimens formed from powder compositions that do not contain the reinforcing particles but are otherwise identical. In preferred embodiments, LS test specimens formed from powder compositions of the present invention exhibit a HDT of at least about 130° C., more preferably at least about 140° C., and even more preferably at least about 150° C.

Powder compositions of the present invention may be used to form a variety of articles for use in a variety of applications. Preferred powder compositions of the present invention are capable of forming LS articles that can withstand elevated temperature environments while still exhibiting one or more suitable mechanical properties. Examples of LS articles that may require such properties include automotive parts (e.g., engine parts and other parts in close proximity to an engine); fuel system parts; household appliance parts that require heat resistance (e.g., dishwasher parts and oven parts); molds for forming molded articles from heated materials; hydraulic parts for contacting heated liquids; intake manifolds (e.g., hot air intakes and aspiration ducts); lighting system parts; and parts or articles in other applications that may be required to perform in elevated temperature environments (e.g., aerospace, motorsport, design, electronics, industrial, and packaging applications).

Powder compositions of the present invention may include reinforcing particles having any of a variety of aspect ratios suitable to achieve the desired mechanical properties. While not intending to be bound by theory, particles having a suitably high aspect ratio are thought to increase the HDT of certain LS articles. In preferred embodiments, powder compositions of the present invention include a suitable amount of reinforcing particles having an aspect ratio of at least about 5:1, more preferably at least about 10:1, even more preferably at least about 15:1, and optimally at least about 20:1. Preferably, the reinforcing particles have an aspect ratio of less than about 200:1, more preferably less than about 100:1, and even more preferably less than about 75:1. If desired, the powder compositions may also include amounts of particles (e.g., as filler) having aspect ratios other than those specified above.

The powder composition of the present invention may include reinforcing particles having any suitable regular or irregular three-dimensional shape, preferably so long as the particles exhibit a suitable aspect ratio. Examples of suitable particle shapes may include acicular, bladed, columnar, equant, fiber, fibril, fibrous, and prismatic and the like. In a preferred embodiment, at least some of the reinforcing particles are acicular. The reinforcing particles may be solid, or substantially solid, in nature or may contain one or more voids.

To be useful in LS applications, reinforcing particles preferably do not melt, or soften to an unsuitable degree, either during the LS process or at the maximum temperature in which LS articles containing the reinforcing particles are expected to perform. As such, to avoid melting of the reinforcing particles during LS processes, reinforcing particles should preferably possess a melting temperature (or degradation temperature) greater than that of the laser-sinterable polymer powder. In preferred embodiments, the reinforcing particles preferably have a melting temperature (or degradation temperature) of greater than about 200° C., more preferably greater than about 500° C., and even more preferably greater than about 1,000° C. In some embodiments, incorporation of reinforcing particles having such melting temperatures may enhance the flame retardancy of resulting LS articles.

Powder compositions of the present invention may include any amount of reinforcing particles sufficient to achieve the desired mechanical properties. Preferably, the powder compositions include at least about 3 wt-%, more preferably at least about 15 wt-%, and even more preferably at least about 20 wt-% of reinforcing particles, based on the total weight of the powder composition. In preferred embodiments, the powder compositions includes less than about 80 wt-%, more preferably less than about 50 wt-%, and even more preferably less than about 40 wt-% of reinforcing particles, based on the total weight of the powder compositions.

Powder compositions of the present invention may include reinforcing particles of any suitable size sufficient to achieve the desired mechanical properties. To enable efficient processing of powder compositions in LS machines, the reinforcing particles preferably have a maximum dimension of less than about 300 microns, more preferably less than about 250 microns, and even more preferably less than about 200 microns. To provide the desired mechanical properties, the reinforcing particles preferably have a maximum dimension that is greater than about 10 microns, more preferably greater than about 50 microns, and even more preferably greater that about 80 microns.

In some embodiments, the median or average maximum dimension of the total amount of reinforcing particles is preferably less than about 300 microns, more preferably less than about 250 microns, and even more preferably less than about 200 microns. In some embodiments, the median or average maximum dimension of the total amount of reinforcing particles is greater than about 10 microns, more preferably greater than about 50 microns, and even more preferably greater that about 80 microns.

If desired, powder compositions of the present invention may also include amounts of particles having maximum dimensions other than those specified above.

The reinforcing particles may exhibit any suitable maximum crosswise dimension to achieve the desired mechanical properties. In preferred embodiments, the reinforcing particles exhibit a maximum crosswise dimension of less than about 100 microns, more preferably less than about 80 microns, and even more preferably less than about 50 microns. Preferably, the reinforcing particles exhibit a maximum crosswise dimension that is greater than about 3 microns, more preferably greater than about 10 microns, and even more preferably greater than about 15 microns.

In some embodiments, the median or average maximum crosswise dimension of the total amount of reinforcing particles is less than about 100 microns, more preferably less than about 80 microns, and even more preferably less than about 50 microns. In some embodiments, the median or average maximum crosswise dimension of the total amount of reinforcing particles is greater than about 3 microns, more preferably greater than about 10 microns, and even more preferably greater than about 15 microns.

If desired, powder compositions of the present invention may also include amounts of particles having maximum crosswise dimensions other than those specified above.

Reinforcing particles suitable to produce LS articles having the desired mechanical properties may be formed from any suitable material. Examples of suitable reinforcing particles may include the following types of particles (preferably when in a particle form having a suitable aspect ratio, maximum dimension, and/or maximum crosswise dimension): inorganic particles such as boron particles, ceramic particles, glass particles (e.g., glass fibers), and mineral particles; organic particles such as carbon particles (e.g., carbon-fiber particles or carbon nanotubes) and polymeric particles (e.g., polyester particles, polyamide particles—including aramid particles such as KEVLAR fibers, and polyvinyl alcohol particles); particles containing both organic and inorganic constituents; and mixtures thereof. For reasons discussed further below, preferably at least some (and in some embodiments all or substantially all) of the reinforcing particles are mineral particles.

Certain reinforcing particles (e.g., asbestos) that may achieve the desired mechanical properties may pose a human health risk. Such reinforcing particles may be used under certain circumstances; however, powder compositions of the present invention preferably include reinforcing particles that do not pose a health risk to handlers of either the powder composition or articles formed therefrom. Preferably, the reinforcing particles exhibit physical properties (e.g., particle sizes and/or bulk densities) that avoid or minimize (1) the dusting of unsuitable quantities of particles into the air during the manufacture of powder compositions or subsequent articles formed therefrom, and/or (2) the time in which the particles, once airborne, remain suspended in the air.

As discussed above, powder compositions of the present invention preferably include an amount of reinforcing particles having at least some mineral particles. Mineral particles such as, for example, wollastonite are inexpensive and readily available on the commercial market in bulk quantities that are of consistent and suitable quality (unlike, e.g., certain glass fibers). As such, mineral particles may be included in powder compositions of the present invention to reduce or eliminate the use of higher cost particles (e.g., carbon and glass fibers). In addition, mineral particles such as, for example, wollastonite are available in white and other light-colored forms, which allows articles to be produced having aesthetic characteristics that may not be possible using similar amounts of other particles such as, for example, carbon fibers. Such aesthetic characteristics may allow for the production of articles having a white, light-colored, and/or bright appearance. Furthermore, the coloration of certain mineral particles can be beneficial to efficient LS processing (unlike, e.g., the dark color of carbon fibers, which as discussed in the Background section, may result in the absorption of unsuitable amounts of infrared energy that can interfere with LS processes).

Powder compositions of the present invention preferably include at least some mineral reinforcing particles. In preferred embodiments, mineral reinforcing particles are present in the powder composition in an amount of at least about 1 wt-%, more preferably at least about 2 wt-%, even more preferably at least about 3 wt-%, and optimally at least about 5 wt-%, based on the total weight of the powder composition. Preferably, the mineral reinforcing particles are present in the powder composition in an amount of less than about 80 wt-%, more preferably less than about 50 wt-%, and even more preferably less than about 40 wt-%, based on the total weight of the powder composition. In some embodiments, the mineral reinforcing particles constitute at least about 10 wt-%, more preferably at least about 25 wt-%, even more preferably at least about 50 wt-%, and optimally at least about 75 wt-% of the total amount of reinforcing particles included in the powder composition.

Certain milling procedures used to produce suitably sized mineral particles may result in particle having unsuitable aspect ratios for purposes of producing LS articles having the desired mechanical properties. To provide mineral particles having suitable aspect ratios, the mineral particles are preferably produced using milling techniques or other suitable techniques that are not overly harsh. Examples of minerals from which mineral particles having suitable aspect ratios may be produced include silicate minerals (e.g., calcium silicates), calcium minerals (e.g., calcium carbonates), barium minerals (e.g., barium sulphates), magnesium minerals (e.g., magnesium hydroxides), and mixtures thereof.

In a preferred embodiment, the mineral particles are silicate minerals that have been suitably processed. Examples of silicate minerals from which suitable reinforcing particles may be produced include ferrobustamite, $Ca(Fe^{2+},Ca,Mn^{2+})[Si_2O_6]$; bustamite, $(Mn^{2+},Ca)[SiO_3]$; vistepite, $Mn_5SnB_2Si_5O_{20}$; cascandite, $Ca(Sc,Fe^{3+})[HSi_3O_9]$; pectolite, $NaCa_2[HSi_3O_9]$; denisovite, $Ca_2(K,Na)Si_3O_8(F,OH)_2$; sérandite, $Na(Mn^{2+},Ca)_2[HSi_3O_9]$; foshagite, $Ca_4[(OH)_2|Si_3O_9]$; hillebrandite, $Ca_2[(OH)_2|SiO_3]$; wollastonite, $CaSiO_3$ (e.g., wollastonite-7T, wollastonite-2M, etc.); rankinite, $Ca_3Si_2O_7$; kilchoanite, $Ca_3Si_2O_7$; larnite, $Ca_2SiO_4$; bredigite, $Ca_7Mg(SiO_4)_4$; hatrurite, $Ca_3[O|SiO_4]$; rosenhahnite, $HCa_3[Si_3O_9(OH)]$; dellaite, $Ca_6Si_3O_{11}(OH)_2$; afwillite, $Ca_3[HSiO_4]_2.2H_2O$; xonotlite, $Ca_6Si_6O_{17}(OH)_2$; jaffeite, $Ca_6[(OH)_6|Si_2O_7]$; suolunite, $Ca_2[H_2Si_2O_7]H_2O$; killalaite, $Ca_3[Si_2O_7].0.5H_2O$; okenite, $CaSi_2O_5.2H_2O$; riversideite, $Ca_5Si_6O_{16}(OH)_2.2H_2O$; trabzonite, $Ca_4Si_3O_{10}.2H_2O$; gyrolite, $Ca_4(Si_6O_{15})(OH)_2.3H_2O$; foshallasite, $Ca_3[Si_2O_7]3H_2O$; tobermorite, $Ca_5Si_6(O,OH)_{18}5H_2O$; clinotobermorite, $Ca_5[Si_3O_8(OH)_2]2.4H_2O$—$Ca_5[Si_6O_{17}].5H_2O$; nekoite, $Ca_3Si_6O_{12}(OH)_6.5H_2O$; plombièrite, $Ca_5Si_6O_{16}(OH)_2.7H_2O$; jennite, $Ca_9H_2Si_6O_{18}(OH)_8.6H_2O$; sillimanite $[Al_2SiO_5]$; tremolite $[Ca_2Mg_5Si_8O_{22}(OH)_2]$ and the like, and mixtures thereof.

Wollastonite is a preferred source of reinforcing particles. In addition to the benefits discussed above, wollastonite exhibits low moisture and oil absorption, low volatile content, and/or high brightness or whiteness—each of which may be desirable in certain embodiments. In some embodiments, the wollastonite may contain small amounts of iron, magnesium, and manganese that may substitute for calcium.

In a presently preferred embodiment, the wollastonite reinforcing particles are acicular. Examples of suitable commercially available acicular wollastonite reinforcing particles include the FILLEX line of products (e.g., the FILLEX 1AE1, 7AE1, 6-AF3, and 2AH3 products) commercially available from H. Osthoff-Petrasch GmbH & Co. of KG, Germany, and the A-60 product commercially available from Wolkem (India), NYCO Minerals Inc. (USA) and R.T. Vanderbilt Co. Inc. (USA).

Reinforcing particles of the present invention may be surface treated or modified. Such surface modification may result in one of the following benefits: improved aesthetics (e.g., appearance, resolution, etc.), improved fabrication, improved dimensional stability, enhanced surface characteristics (e.g., improved water repellency or hydrophobicity), improved wet-out between resin and filler components, controlled rheological properties (e.g., higher loading with elimination or reduction in viscosity increases), improved filler dispersion (e.g., elimination or reduction in occurrence of filler agglomerates), and combinations thereof. Silane-surface treatment is an example of a preferred surface treatment.

The reinforcing particles of the present invention preferably have a bulk density of at least about 0.3 grams per cubic centimeter ("g/cc"), more preferably at least about 0.5 g/cc, and even more preferably at least about 0.7 g/cc. In preferred embodiments, the reinforcing particles preferably have a bulk density of less than about 5 g/cc, more preferably less than about 4 g/cc, and even more preferably less than about 2 g/cc.

As discussed above, powder compositions of the present invention preferably include one or more laser-sinterable polymer powders. When suitably processed in a LS machine, the laser-sinterable polymer powders are preferably capable of forming an LS article having a polymeric matrix. Examples of suitable laser-sinterable polymer powders may include powders suitably formed from polyamides, polyesters, polyolefins (e.g., polyethylene and polypropylene), polyetherketones, polyurethanes, polyvinyl acetates, polymethacrylates, phenolics, ionomers, polyacetals, acrylonitrile-butadiene-styrene copolymers, polyimides, polycarbonates, and copolymers and mixtures thereof.

Current commercially available LS machines are typically capable of sintering materials having a melting temperature of about 230° C. or less. To be useful in processes utilizing such machines, powder compositions of the present invention preferably include at least one laser-sinterable polymer powder having a melting temperature of less than about 230° C., more preferably less than about 220° C., and even more preferably less than about 210° C.

Powder compositions of the present invention preferably do not melt at a temperature less than or equal to a maximum temperature at which LS articles formed therefrom are desired to perform. In preferred embodiments, the one or more laser-sinterable polymer powders preferably have a melting temperature of greater than about 130° C., more preferably greater than about 140° C., even more preferably greater than about 150° C., and optimally greater than about 170° C.

Powder compositions of the present invention may include any suitable amount of the one or more laser-sinterable polymer powders. Preferably, the powder composition includes at least about 20 wt-%, more preferably at least about 50 wt-%, and even more preferably at least about 60 wt-% of laser-sinterable polymer powder, based on the total weight of the powder composition. In preferred embodiments, the powder composition includes less than about 97 wt-%, more preferably less than about 85 wt-%, and even more preferably less than about 80 wt-% of laser-sinterable polymer powder, based on the total weight of the powder composition.

In a preferred embodiment, a powder composition of the present invention includes one or more laser-sinterable polyamide powders. Examples of suitable polyamides may include nylon 6; nylon 6,6; nylon 6,10; nylon 6,12; nylon 6,13; nylon 8,10; nylon 8,12; nylon 10,12; nylon 11 (e.g., the RILSAN D60 product available from Arkema of Philadelphia, Pa.); nylon 12 (e.g., the DURAFORM PA product available from 3D Systems of Valencia, Calif.); nylon 12,12; copolymerized nylons (e.g., the ELVAMIDE line of nylon copolymers available from DuPont Co., Wilmington, Del. and the VESTAMELT line of nylon copolymers available from Degussa of Frankfurt, Germany); and copolymers and mixtures thereof. Additional useful polyamide powders may include end-capped polyamides such as, for example, the VESTOSINT line of end-capped nylons (e.g., VESTOSINT X-1546 available from Degussa of Frankfurt, Germany).

Thermosetting resins may also be included in powder compositions of the present invention. Thermosetting resins typically provide an inflexible article in an LS process. Examples of suitable thermosetting resins may include epoxies, acrylates, vinyl ethers, unsaturated polyesters, bismaleimides, and copolymers and mixtures thereof. In some embodiments, thermoplastic resins, thermosetting resins, or a mixture of one or more thermoplastic resins and one or more thermosetting resins may be included in powder components of powder compositions of the present invention.

The polymer particles making up the laser-sinterable polymer powder preferably exhibit a maximum dimension of at least about 10 microns, more preferably at least about 20 microns, and even more preferably at least about 40 microns. In preferred embodiments, the laser-sinterable polymer particles preferably exhibit a maximum dimension of less than about 200 microns, more preferably less than about 150 microns, and even more preferably less than about 80 microns. In some embodiments, the reinforcing particles and laser-sinterable polymer powder are selected so that the maximum dimension of the reinforcing particles is approximately equivalent to or smaller than the maximum dimension of the polymer particles of the laser-sinterable polymer powder.

The laser-sinterable polymer powder preferably has a bulk density of at least about 0.3 g/cc, more preferably at least about 0.35 g/cc, and even more preferably at least about 0.4 glee. In preferred embodiments, the laser-sinterable polymer powder preferably has a bulk density of less than about 3 g/cc, more preferably less than about 2 g/cc, and even more preferably less than about 1 g/cc.

Powder compositions of the present invention may also contain one or more other optional ingredients. Preferably, the optional ingredients do not adversely affect the powder compositions or articles formed therefrom. Such optional ingredients may be included, for example, to enhance aesthetics; to facilitate manufacturing, processing, and/or handling of powder compositions or articles formed therefrom; and/or to further improve a particular property of powder compositions or articles formed therefrom. Each optional ingredient is preferably included in a sufficient amount to serve its intended purpose, but not in such an amount to adversely affect a powder composition or an article resulting therefrom. These optional ingredients are preferably particulate materials and may include organic and/or inorganic materials. Optional ingredients preferably have a particle size in the range of the particle sizes of the polymer powder and/or the reinforcing particles. Each optional ingredient is preferably milled, if necessary, to the desired median particle size and particle size distribution.

Each individual optional ingredient, if present at all, typically is present in the powder composition in an amount of about 0.1 wt-% to about 50 wt-%. The total amount of optional ingredients in the powder composition preferably ranges from about 0 wt-% up to about 50 wt-%. It is not necessary for an optional ingredient to melt during a LS process. Preferably each optional ingredient is suitably compatible with the one or more powder polymers and/or the reinforcing particles to provide a strong and durable article.

In some embodiments, the powder composition of the present invention contains an optional flow agent. The flow agent preferably is present in an amount sufficient to allow the powder composition to flow and level on the build surface of a LS machine. When present, the powder composition preferably contains about 0.01 wt-% to about 5 wt-%, more preferably about 0.05 wt-% to about 2 wt-%, and even more preferably about 0.1 wt-% to about 1 wt-% of flow agent, based on the total weight of the powder composition. The optional flow agent is preferably a particulate inorganic material having a maximum dimension of less than about 10 microns. Examples of suitable flow agents include hydrated silica, amorphous alumina, glassy silica, glassy phosphate, glassy borate, glassy oxide, titania, talc, mica, a fumed silica, kaolin, attapulgite, calcium silicate, alumina, magnesium silicate, and mixtures thereof. Fumed silica is a preferred flow agent.

In some embodiments, the powder composition of the present invention may include metal fillers such as, for example, aluminum powder, copper powder, tin powder, bronze powder, and mixtures thereof.

Additional optional ingredients include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, and mixtures thereof.

Preferably, each ingredient of the powder composition of the present invention is suitably dry (e.g., contains a minimal amount of moisture—preferably 2 wt-% or less). All composition ingredients may be milled, ground, or otherwise processed, if necessary, to provide a desired particle size or range of particle sizes.

Powder compositions of the present invention may be formed using any suitable technique. The ingredients may be blended together all at once or in any order. Preferably, the ingredients are blended until a uniform powder composition has been formed. The ingredients may be blended using mechanical mixing, pneumatic mixing (e.g., by blowing air into silos that contain the various components), or any other suitable mixing technique. After blending, the resulting powder composition may be sieved to provide a powder having a desired particle size and particle size distribution.

In some embodiments, the reinforcing particles may be melt blended with polymer pellets or polymer powders and then pelletized into small pellets containing the reinforcing particles embedded within. The pellets may then be processed using any suitable techniques (e.g., cryogenic milling) to form a suitable powder composition.

LS articles of the present invention may be produced from the powder compositions using any suitable LS processes. LS articles of the present invention preferably include a plurality of overlying and adherent sintered layers that include a polymeric matrix having reinforcement particles dispersed throughout the polymeric matrix.

Figure 3A:
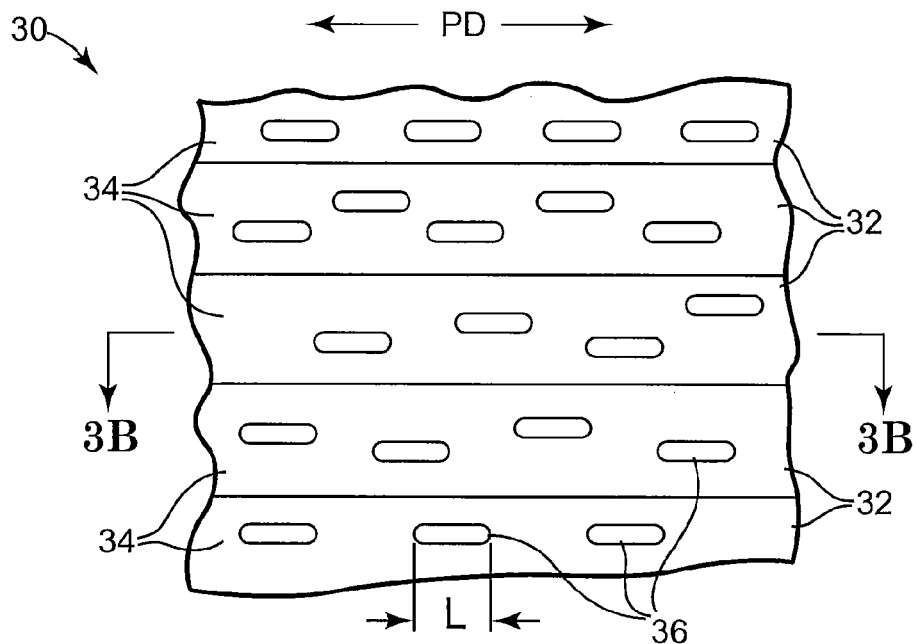
FIG. 3A is a schematic cross-sectional view of a portion of a LS article containing reinforcing particles.
Figure 3B:
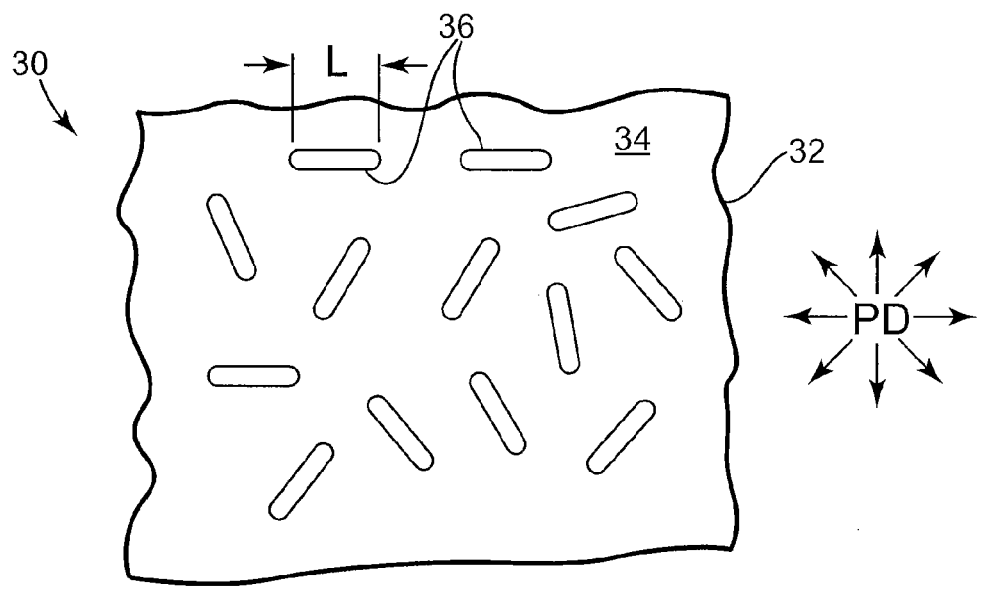
FIG. 3B is a schematic cross-sectional view of the LS article portion of FIG. 3A. as taken along line 3B-3B of FIG. 3A.
Figure 4A:
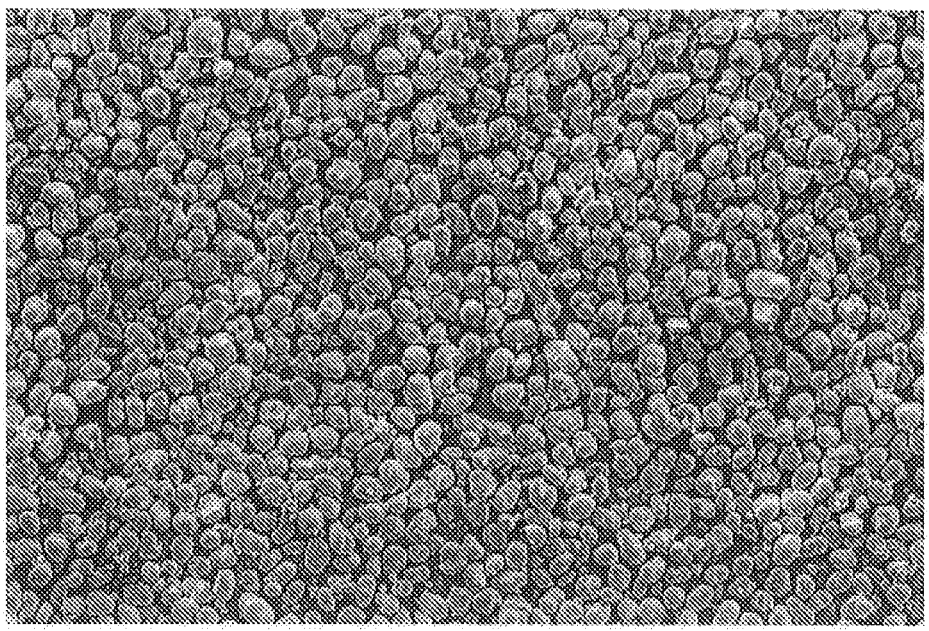
FIG. 4A is a reflection electron micrograph of unfilled DURAFORM PA nylon 12 powder.
Figure 4B:
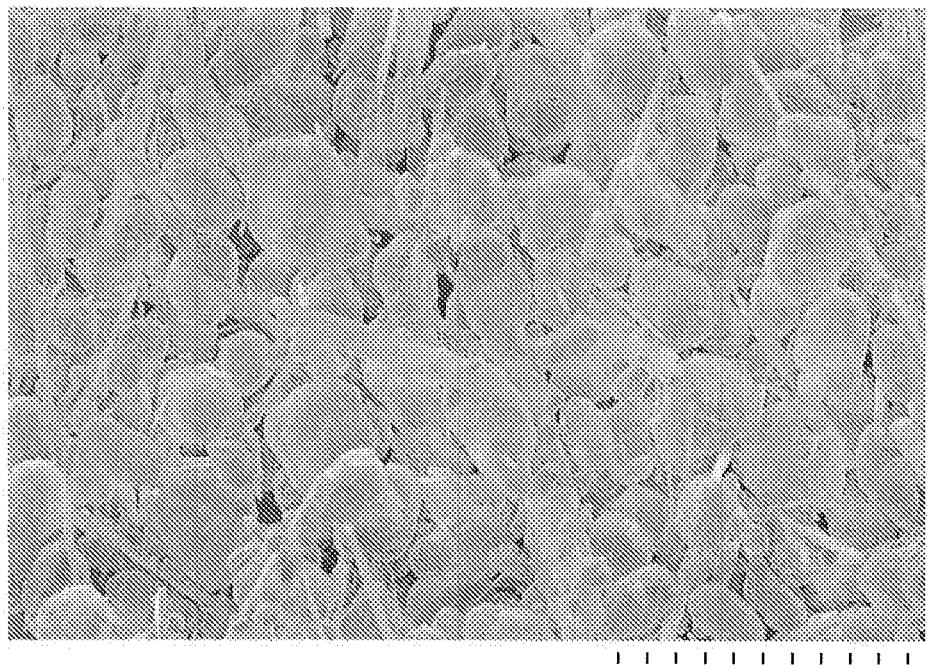
FIG. 4B is a reflection electron micrograph of a powder composition including 75 wt-% DURAFORM PA nylon 12 powder and 25 wt-% A60 wollastonite.

The sintered layers of LS articles of the present invention may be of any thickness suitable for LS processing. The plurality of sintered layers are each, on average, preferably at least about 50 microns thick, more preferably at least about 80 microns thick, and even more preferably at least about 100 microns thick. In a preferred embodiment, the plurality of sintered layers are each, on average, preferably less than about 200 microns thick, more preferably less than about 150 microns thick, and even more preferably less than about 120 microns thick FIGS. 3A and 3B illustrate a representative sample of one embodiment of LS article 30, with FIG. 3A showing a schematic side cross-sectional view of LS article 30 and FIG. 3B showing a schematic top cross-sectional view of LS article 30 as taken along line 3B-3B of FIG. 3A. FIGS. 3A and 3B are not drawn to scale. LS article 30 preferably includes a plurality of adherent sintered layers 32 that include polymer matrix 34 and reinforcing particles 36 dispersed throughout matrix 34. As shown in FIGS. 4A and 4B, in some embodiments, maximum dimensions L of reinforcement particles 36 are preferably oriented substantially parallel to planar direction PD of sintered layers 32.

Certain embodiments of the powder composition of the present invention may be formed into molds, via a suitable LS process, that are capable of molding molten materials (e.g., plastics and rubbers) into molded products. In a preferred embodiment, the powder composition is configured so that a mold formed therefrom is capable of suitably molding a molten material having a temperature of greater than 130° C., more preferably greater than about 140° C., and even more preferably greater than about 150° C. into a molded product.

Test Methods

Unless indicated otherwise, the following test methods were utilized in the Examples that follow. The elongation at break, tensile strength at break, and tension modulus testing was performed using International Standard Organization (ISO) 3167 Type 1A 150 mm long multipurpose dog-bone test specimens having a center section that was 80 mm long by 4 mm thick by 10 mm wide and having sintered layers oriented in a flatwise planar direction relative to the flatwise face of the test specimens (i.e., in a direction similar to that of LS test specimens for HDT testing).

A. Heat Deflection Temperature

HDT testing was performed using Method A of ISO 75-2:2004 to assess the mechanical properties of LS articles at elevated temperatures. In accordance with method A of ISO 75-2:2004, 1.8 megapascals ("MPa") were applied to 80×10×4 millimeters (mm) (length×width×thickness) LS test specimens in the flatwise position.

B. Elongation at Break

Elongation at break testing was performed according to ISO 527. LS test specimens formed from powder compositions of the present invention preferably exhibit an elongation at break of at least about 3%, more preferably at least about 5%, and even more preferably at least about 10%.

C. Tensile Strength at Break

Tensile strength at break testing was performed according to ISO 527. LS test specimens formed from powder compositions of the present invention preferably exhibit a tensile strength at break of at least about 30 MPa, more preferably at least about 40 MPa, and even more preferably at least about 50 MPa.

D. Tension Modulus

Tension modulus testing was performed according to ISO 527. LS test specimens formed from powder compositions of the present invention preferably exhibit a tension modulus of at least about 3,000 MPa, more preferably at least about 4,000 MPa, and even more preferably at least about 5,000 MPa.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Abbreviations, Descriptions, and Sources of Materials

| | |
|---|---|
| A60 | Untreated wollastonite from MIAL - Feldmeilen of Switzerland, which according to product literature has an aspect ratio from about 15:1 to 20:1. |
| AEROSIL R920 | Surface-treated amorphous silica from Degussa of Frankfurt, Germany. |
| ALUMET H30 | Substantially spherical aluminum powder from Valimet of Stockton, CA. |
| DURAFORM PA | Unfilled nylon 12 powder for LS from 3D Systems of Valencia, CA. |
| DURAFORM GF | Glass-filled nylon 12 powder for LS from 3D Systems of Valencia, CA containing 50 wt-% of substantially spherical glass particles. |
| FILLEX 1AF1 | Silane-surface-treated wollastonite from MIAL - Feldmeilen of Switzerland, which according to product literature has an aspect ratio from about 15:1 to 20:1. |
| FILLEX2 AH3 | Silane-surface-treated wollastonite from MIAL - Feldmeilen of Switzerland, which according to product literature has an aspect ratio from about 15:1 to 20:1. |
| Nylon 11 | RILSAN D60 nylon 11 powder from Arkema of Philadelphia, PA. |
| SV-44 | Untreated high-aspect ratio wollastonite from MIAL - Feldmeilen of Switzerland, which according to product literature has an aspect ratio from about 15:1 to 44:1. |
| VESTAMELT 3261 | Copolyamide hotmelt adhesive pellets from Degussa of Frankfurt, Germany. |

Materials Preparation

The compositional makeup of the powder compositions of each of respective Examples 1-8 and Comparative Examples A and B is provided below in Table 1. Comparative Examples A and B are commercially available powder compositions that were purchased.

Examples 1-7

Preparation of Wollastonite-Containing Polymer Powders

For each of the powder compositions of Examples 1-7, the materials listed in Table 1 were added in the indicated amounts to the mixing vessel of a Mixaco Mischer CM 150 mixer. The materials were dry blended at 100 revolutions-per-minute ("rpm") in three 45-second-long mixing steps to form homogenous powder blends.

Example 8

Preparation of Wollastonite-Containing Polymer Powder

The materials of Example 8 listed in Table 1, were added in the indicated amounts to the mixing vessel of a Mixaco Mischer CM 150 mixer and blended at room temperature in two 30-second-long mixing steps. The resulting blend was compounded in a FVB19/25 twin-screw extruder (from OMC of Saronno, Italy) and then pelletized into small pellets. To produce a powder suitable for LS applications, the resulting pellets were continuously fed at a rate of between 100 and 300 grams per minute into an Alpine Contraplex 160 C mill and cryogenically milled at between about 12,000 and 16,000 rpm at a temperature of about −50° C.

TABLE 1

| | Example | | | | | | | | | |
|---|---|---|---|---|---|---|---|---|---|---|
| Material[1] | A* | B* | 1** | 2** | 3** | 4** | 5** | 6** | 7** | 8** |
| DURAFORM PA | 100 | | 30 | | | 30 | 30 | 30 | 26 | |
| DURAFORM GF | | 100 | | | | | | | | |
| Nylon 11 | | | | 30 | | | | | | |
| VESTAMELT 3261 | | | | | 30 | | | | | 30 |
| A60 | | | 10 | 10 | 10 | | | | 4 | 10 |
| FILLEX 1AF1 | | | | | | 10 | | | | |
| SV-44 | | | | | | | 10 | | | |
| FILLEX 2AH3 | | | | | | | | 10 | | |
| AEROSIL R920 | | | .050 | .050 | .050 | .050 | .050 | .050 | .040 | |
| ALUMET H30 | | | | | | | | | | 10 |

*Materials listed by weight percent.
**Materials listed in kilograms.

Reflection Electron Micrograph of
Wollastonite-Containing Polymer Powder

FIG. 4A is a reflection electron micrograph of unfilled DURAFORM PA nylon 12 powder. FIG. 4B is a reflection electron micrograph of a powder composition of the present invention prepared pursuant to the method of Examples 1-7 that includes 75 wt-% DURAFORM PA nylon 12 powder and 25 wt-% A60 wollastonite. The wollastonite particles are the jagged, needle-like particles shown in FIG. 4B.

Production of LS Articles

To assess the suitability of the powders of Examples 1-8 for producing LS articles, each of the respective powders of Examples 1-8 were applied to a build surface of a VANGUARD HS LS system (from 3D Systems of Valencia, Calif.) and used to construct LS articles. The LS articles were produced using layer thicknesses of between about 0.1 and 0.15 mm, a laser power setting of between about 20 and 50 Watts, and a laser scan spacing of between about 0.15 mm and 0.40 mm. The resulting LS articles exhibited good coloration and resolution and did not exhibit any noticeable curl, thereby indicating that the powders of Examples 1-8 were suitable for use in forming LS articles.

Mechanical Properties

To assess the mechanical properties of LS articles of the present invention, test specimens were produced from the powders of each of Example 1-8 and Comparative Examples A and B using the VANGUARD HS LS system. Between 4 and 5 of the test specimens of each of the respective powders were subjected to the test methods described above in the Test Methods section. The results of these tests are presented below in Table 2.

As illustrated by Table 2, the test specimens of Examples 1-8 exhibited one or more desirable mechanical properties relative to the unfilled test specimens of Comparative Example A, with the test specimens of each of these Examples exhibiting a HDT that was markedly higher than that of Comparative Example A. In addition, the test specimens of Examples 1-6 exhibited tensile strengths at break that were similar to that of Comparative Example A (with the test specimens of Example 4 exhibiting a tensile strength at break slightly greater than that of the test specimen of Comparative Example A). In addition, the elongation at break and modulus values exhibited by the test specimens of Examples 1-8 were acceptable.

The test specimens of Comparative Example B (containing 50 wt-% of spherical glass filler particles) also exhibited an increased HDT relative to Comparative Example A, but not as high as the HDT exhibited by the test specimens of Examples 1, 2 and 4-6. However, unlike the test specimens of Examples 1-6, the test specimen of Comparative Example 13 exhibited a substantially diminished tensile strength at break relative to the test specimens of Comparative Example A. As such, LS articles formed from the composition of Comparative Example B may be unsuitable for certain LS applications requiring a HDT greater than about 134° C. and/or a tensile strength greater than about 27 MPa. While not intending to be limited by theory, the diminished tensile strength of the test specimens of Comparative Example A is thought to be attributable to the low aspect ratio of the spherical glass filler particles.

Thus, the results of Table 2 indicate that the wollastonite-containing test specimens of Examples 1-8 exhibited enhanced HDT relative to an unfilled LS article (i.e., the test specimens of Comparative Example A). Further, the wollastonite-containing test specimens of Examples 1-6 did not exhibit a diminished tensile strength at break (relative to the test specimens of Comparative Example A) such as that exhibited by an LS article containing conventional glass filler particles (i.e., the test specimens of Comparative Example B).

TABLE 2

| Example | Elongation (%) | Tensile Strength (MPa) | Modulus (MPa) | HDT (° C.) |
|---------|----------------|------------------------|---------------|------------|
| A | 12 | 46 | 1550 | 88 |
| B | 2 | 27 | 4712 | 134 |
| 1 | 4 | 41 | 4732 | 158 |
| 2 | 7 | 45 | 2320 | 135 |
| 3 | 4 | 43 | 5495 | 127 |
| 4 | 5 | 47 | 5029 | 145 |
| 5 | 5 | 46 | 5129 | 155 |
| 6 | 5 | 45 | 5018 | 162 |
| 7 | 4 | 31 | 3680 | 125 |
| 8 | 3 | 30 | 4315 | 127 |

Additional laser sintering runs were conducted using the powders of Example 6 and Comparative Example A to form test specimens. By optimizing the run parameters of the laser-sintering system, wollastonite-containing test specimens of Example 6 were produced which exhibited tensile strengths that were both (i) in excess of 50 MPa and (ii) higher than the tensile strengths of test specimens of Comparative Example A. The enhanced tensile strength was achieved without compromising other mechanical properties of the test specimens.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A powder composition comprising at least 60 wt-% of a laser-sinterable polyamide,
   wherein the polyamide comprises nylon-6,10, nylon-6,12, nylon 6,13, nylon 8,10, nylon 8,12, nylon 10,10, nylon 10,12, nylon 12,12, nylon-11, nylon-12, or a mixture thereof, and wherein the laser-sinterable polyamide has a bulk density from at least 0.4 grams per cubic centimeter to less than 1 grams per cubic centimeter; and
   at least 20 wt-% and less than 40 wt-% of reinforcing particles having an aspect ratio of at least about 5:1 and a maximum dimension of less than about 300 microns, based on the total weight of the powder composition;
   wherein at least a portion of the reinforcing particles are mineral particles, wherein the powder composition comprises at least 1 wt-% of the mineral particles, based on the total weight of the powder composition, and wherein the mineral particles comprise a silicate.

2. A powder composition comprising at least 50 wt-% of a laser-sinterable polyamide,
   wherein the polyamide comprises nylon-6,10, nylon-6,12, nylon 6,13, nylon 8,10, nylon 8,12, nylon 10,10, nylon 10,12, nylon 12,12, nylon-11, nylon-12, or a mixture thereof, and wherein the at least one laser-sinterable polyamide has a bulk density from at least 0.4 grams per cubic centimeter to less than 1 grams per cubic centimeter; and at least about 3 weight percent of reinforcing particles having an aspect ratio of at least about 5:1 and a maximum dimension of less than about 300 microns, based on the total weight of the powder composition;

wherein at least a portion of the reinforcing particles are mineral particles, wherein the powder composition comprises at least 1 wt-% of the mineral particles, based on the total weight of the powder composition, and wherein at least a portion of the mineral particles comprise one or more of ferrobustamite, bustamite, vistepite, cascandite, pectolite, denisovite, sérandite, foshagite, hillebrandite, wollastonite, rankinite, kilchoanite, larnite, bredigite, hatrurite, rosenhahnite, dellaite, afwillite, xonotlite, jaffeite, suolunite, killalaite, okenite, riversideite, trabzonite, gyrolite, foshallasite, tobermorite, clinotobermorite, nekoite, plombièrite, jennite, sillimanite, tremolite, or a mixture thereof.

3. The powder composition of claim 2, wherein the powder composition comprises at least 3 wt-% of the mineral particles, based on the total weight of the powder composition.

4. The powder composition of claim 2, wherein, when the powder composition is laser sintered to form a test specimen, the reinforcing particles are present in an amount sufficient to increase the heat deflection temperature of the test specimen by at least about 10° C. relative to a reference test specimen produced by laser sintering a powder composition that does not include the reinforcing particles but is otherwise identical.

5. The powder composition of claim 2, wherein, when the powder composition is laser sintered to form a test specimen, the test specimen has a heat deflection temperature of at least about 130° C.

6. The powder composition of claim 2, wherein, when the powder composition is laser sintered to form a test specimen, the test specimen has a heat deflection temperature of at least about 150° C.

7. The powder composition of claim 2 comprising at least 50 wt-% of nylon-12 and
at least 5 weight percent of wollastonite particles having an aspect ratio of at least about 5:1 and a maximum dimension of less than about 300 microns, based on the total weight of the powder composition.

8. The powder composition of claim 7, wherein the powder composition includes at least 10 wt-% of wollastonite particles having an aspect ratio of at least 10:1.

9. The powder composition of claim 7, wherein the wollastonite particles have an aspect ratio of at least 20:1.

10. The powder composition of claim 7, wherein, when the powder composition is laser sintered to form a test specimen, the test specimen has a heat deflection temperature of at least 140° C.

11. The powder composition of claim 7, wherein, when the powder composition is laser sintered to form a test specimen, the reinforcing particles are present in an amount sufficient to increase the heat deflection temperature of the test specimen by at least about 10° C. relative to a reference test specimen produced by laser sintering a powder composition that does not include the reinforcing particles but is otherwise identical.

12. The powder composition of claim 2, wherein
the polyamide further comprises a nylon copolymer.

13. The powder composition of claim 12, wherein the mineral particles comprise wollastonite particles.

14. The powder composition of claim 13, wherein the wollastonite particles have an aspect ratio of at least 10:1.

15. The powder composition of claim 12, wherein the mineral particles have an aspect ratio of at least 10:1.

16. A powder composition comprising at least 50-wt% of a laser-sinterable polyamide, wherein the polyamide comprises nylon-6,10, nylon-6,12, nylon 6,13, nylon 8,10, nylon 8,12, nylon 10,10, nylon 10,12, nylon 12,12, nylon-11, nylon-12, or a mixture thereof, and wherein the at least one laser-sinterable polyamide has a bulk density from at least 0.4 grams per cubic centimeter to less than 1 grams per cubic centimeter; and at least about 3 weight percent of reinforcing particles having an aspect ratio of at least about 5:1 and a maximum dimension of less than about 300 microns, based on the total weight of the powder composition;

wherein at least a portion of the reinforcing particles are mineral particles, wherein the powder composition comprises at least 1 wt-% of the mineral particles, based on the total weight of the powder composition, and wherein the mineral particles comprise wollastonite.

17. A powder composition comprising at least 50 wt-% of a laser-sinterable polyamide, wherein the polyamide comprises nylon-6,10, nylon-6,12, nylon 6,13, nylon 8,10, nylon 8,12, nylon 10,10, nylon 10,12, nylon 12,12, nylon-11, nylon-12, or a mixture thereof, and wherein the at least one laser-sinterable polyamide has a bulk density from at least 0.4 grams per cubic centimeter to less than 1 grams per cubic centimeter; and at least about 3 weight percent of reinforcing particles having an aspect ratio of at least about 5:1 and a maximum dimension of less than about 300 microns, based on the total weight of the powder composition;

wherein at least a portion of the reinforcing particles are mineral particles, wherein the powder composition comprises at least 1 wt-% of the mineral particles, based on the total weight of the powder composition, and wherein the maximum dimension of the reinforcing particles is equivalent to or smaller than the maximum dimension of the polymer particles of the at least one laser-sinterable polyamide.

18. The powder composition of claim 17, wherein the reinforcing particles have a maximum dimension of less than about 200 microns.

19. The powder composition of claim 18, wherein the reinforcing particles have a maximum dimension of greater than about 10 microns.

20. The powder composition of claim 17, wherein the polymer particles of the at least one laser-sinterable polyamide have, on average, a maximum dimension of less than about 200 microns.

21. The powder composition of claim 17, wherein, when the powder composition is laser sintered to form a test specimen, the test specimen has a tensile strength of at least about 40 MPa.

22. The powder composition of claim 17, wherein the powder composition includes at least 5 wt-% of the mineral particles.

23. The powder composition of claim 17, wherein the reinforcing particles have a bulk density of from 0.5 grams per cubic centimeter to less than 4 grams per cubic centimeter.

24. The powder composition of claim 17, wherein the reinforcing particles have a bulk density of from 0.7 grams per cubic centimeter to less than 2 grams per cubic centimeter.

25. A powder composition comprising at least 50 wt-% of a laser-sinterable polyamide,
wherein the polyamide comprises nylon-6,10, nylon-6,12, nylon 6,13, nylon 8,10, nylon 8,12, nylon 10,10, nylon 10,12, nylon 12,12, nylon-11, nylon-12, or a mixture thereof, and wherein the at least one laser-sinterable polyamide has a bulk density from at least 0.4 grams per cubic centimeter to less than 1 grams per cubic centimeter; and at least 10 wt-% of mineral particles having an aspect ratio of at least about 5:1 and a maximum dimension of less than about 300 microns, based on the total weight of the powder composition.

26. The powder composition of claim 25, wherein the powder composition includes at least about 15 wt-% of the mineral particles.

27. The powder composition of claim 25, wherein the mineral particles have an aspect ratio of at least 10:1 and comprise a silicate-containing mineral.

* * * * *